United States Patent [19]

Bellettini et al.

[11] Patent Number: 5,304,352

[45] Date of Patent: Apr. 19, 1994

[54] ATMOSPHERIC ULTRA-VIOLET LASER OZONOGENESIS

[76] Inventors: Arturo G. Bellettini, 1301 Stonehenge Rd., Charleston, W. Va. 25314; Richard J. Bellettini, 330 N. Cordova St., Burbank, Calif. 91505

[21] Appl. No.: 819,989

[22] Filed: Jan. 13, 1992

[51] Int. Cl.$^5$ .................. C01B 13/10; B64G 1/10
[52] U.S. Cl. .................. 422/186; 422/186.07; 204/157.41; 244/1 R; 244/158 R; 244/904
[58] Field of Search .................. 422/186.07, 186; 204/157.41; 244/1 R, 158 R, 904

[56] References Cited

U.S. PATENT DOCUMENTS

| | | | |
|---|---|---|---|
| 3,702,973 | 11/1972 | Daugherty et al. | 331/94.5 PE |
| 3,766,380 | 10/1973 | Menzies | 250/343 |
| 4,252,623 | 2/1981 | Vaseen | 204/157.1 R |
| 4,402,480 | 9/1983 | Udell | 244/158 R |
| 4,709,373 | 11/1987 | Scott et al. | 372/86 |

OTHER PUBLICATIONS

Dolan, Thomas, "Space Nuclear Power Requirements for Ozone Layer Modification", Idaho Natl. Eng. Lab ID 83415-1550, AIP Conf. Proc., 246, Jan. 22, 1992
Sizoja, I. M.; Sukhorvkov, A. P. (USSR) "No Nuclear Effects Resulting from Laser Photolysis of Ozone in the Atmosphere," 5-i Uses. Simdoz, PO Rasprostr. Lazer, Izluch. Vatmosf. Tez. Dokl. CH5, Tomsk 120-4 (RUSS) 1979. CHPM Abs. Only.
Amimoto, S. T.; Force, A. P.; "Ozone Photochemistry: Production and Deactivation of Atomic Oxygen Following Photolysis at 248 Nm.", Chem Phys. Lett., 60(1), 40-3, 1978. Chem. Abs. Only.
In re Morzocchi and Horton, 169 USPQ 367, 1971.
In re Colianni, 195 USPQ 150, 1977.

Primary Examiner—Donald P. Walsh
Assistant Examiner—Daniel Jenkins

[57] ABSTRACT

A method of converting diatomic oxygen to a free-radical version such that the combination of the two can produce ozone. It is widely held that the ozone layer is becoming depleted as ever increasing levels of chloroflourocarbons become present at that altitude. It is believed that even though such ozone-destroying chemicals will be banned by the year two-thousand their effects will be felt long after. A method for combating the depletion of ozone would not only be of tremendous value to the environment but it would also herald the advent of technology serving to function on a worldwide scale. The method for producing free-radical oxygen would simply involve using coherent ultra-violet light produced by a laser mounted on a satellite; the satellite being in geo-synchronous orbit about the location where ozone depletion is evident(i.e. Antarctica). When the ultra-violet light hits available atmospheric oxygen it should act to break the oxygen-oxygen bond to produce ozone.

1 Claim, No Drawings

ATMOSPHERIC ULTRA-VIOLET LASER OZONOGENESIS

BACKGROUND OF THE INVENTION

1. Field of the Invention

This invention relates to a method of producing ozone using ultra-violet light to break the oxygen-oxygen bond of diatomic oxygen to produce a free-radical species of oxygen. The production of ozone would follow as the free-radical reacts with diatomic oxygen. The means of producing the necessary ultra-violet light would come from a satellite that is equipped to elicit such a wavelength of light in coherent form(laser). Once the satellite is in geo-synchronous orbit about an ozone depleted area it would act to send ultra-violet light of an intensity and wavelength that would set into motion the ozone-producing process. The wavelength of light produced would be at least of an energy that causes the breakage of the oxygen-oxygen bond. It is estimated that the required wavelength would be 242 nanometers or shorter. At such a wavelength the oxygen-oxygen bond should easily be broken. It should be noted that since solar radiation is lacking in intensity at those wavelengths the production of such radiation would have a complementary effect to the sun. Using a laser to produce light of an energy on the order of ten petawatts should create an additional twenty percent of ozone in the ozone layer.

2. Prior Art

The use of lasers to produce ultra-violet light has been documented however the application of such light has been limited strictly to scientific experimentation. The use of ultra-violet light for the purpose of producing ozone on an atmospheric scale would be truly unique.

SUMMARY OF THE INVENTION

The main use of lasers has been where coherent light is crucial to the application at hand. Such coherent light possesses the ability to traverse large distances while supplying energy with pin-point accuracy to a given target. With these properties in mind it seems only natural that laser light be used to bring about an atmospheric reaction that can benefit mankind in an incalculable way. In order for a laser to be used in the atmosphere it must be placed at a high enough altitude to allow for maximal effect with minimal interference from the intervening space. Placement of the laser on an orbiting satellite would allow for near contact with that portion of the atmosphere that is to be lased, namely the ozone layer. It would simply be a matter of powering the laser from the satellite using solar energy or nuclear power. The laser to be used to break the bond of atmospheric oxygen would be a commercially available excimer laser pumped dye laser, spectral range 200–970 nm, delivering 30 mJ within 150 fs to 50 ps.

Many other variations are possible, for example the laser used in the production of ozone could be mounted on a high flying aircraft instead of a satellite for more direct contact with the ozone layer. In addition the laser could elicit a combination of light wavelengths for a more effective and/or controlled ozone reaction. Finally the laser light could be reflected back through the atmosphere a number of times using a reflective surface mounted on an airplane. As the laser is fired from the satellite, the plane's reflective surface would be there to intercept it and reflect it back to the satellite. The satellite could then reflect the light back to the airplane at a new location using computer targeting. This would eliminate the need for the laser to have to emit light continuously since each burst would be of sufficient energy and duration to bring about the desired effect to the ozone layer.

Accordingly, the scope of the invention should be determined not by the embodiment illustrated, but by the claims and their legal equivalents.

I claim:

1. A method for generating ozone in the upper atmosphere consisting essentially of:
   mounting a laser on a high altitude platform selected from either a satellite or an aircraft,
   and passing laser light through said atmosphere, wherein said laser light is capable of producing ozone from oxygen.

* * * * *